United States Patent
Rüther

[11] Patent Number: 6,039,501
[45] Date of Patent: Mar. 21, 2000

[54] MODULAR FURNITURE

[76] Inventor: Hubert Rüther, Elbring 12. D-21217, Seevetal, Germany

[21] Appl. No.: 09/014,105

[22] Filed: Jan. 27, 1998

[30] Foreign Application Priority Data

Jan. 29, 1997 [DE] Germany .................... 297 02 242 U

[51] Int. Cl.⁷ .................................................. B25G 3/00
[52] U.S. Cl. ..................... 403/231; 403/403; 403/119; 312/265.4; 211/182; 211/189
[58] Field of Search ........................... 403/326, 329, 403/231, 230, 402, 119, 403; 312/265.1, 265.4, 111; 211/182, 189, 194

[56] References Cited

U.S. PATENT DOCUMENTS

| | | | |
|---|---|---|---|
| 2,832,943 | 4/1958 | Cutler | 403/326 |
| 3,479,975 | 11/1969 | Ferdinand et al. | 403/403 |
| 4,149,352 | 4/1979 | Allen . | |
| 4,353,661 | 10/1982 | Ruther . | |
| 4,410,292 | 10/1983 | Ruther . | |
| 4,411,639 | 10/1983 | Ruther . | |
| 4,432,590 | 2/1984 | Lawrence et al. | 312/265.4 |
| 4,515,280 | 5/1985 | Sheu | 211/189 |
| 5,176,349 | 1/1993 | Bendorf | 403/326 |

FOREIGN PATENT DOCUMENTS

| | | |
|---|---|---|
| 1 753 074 | 5/1972 | Australia . |
| 0 007 065 | 1/1980 | European Pat. Off. . |
| 2 571 449 | 4/1986 | France . |
| 36 03 585 | 9/1986 | Germany . |
| 91 16 531 | 5/1993 | Germany . |
| 94 17 168 | 3/1995 | Germany . |
| 295 02 511 | 5/1995 | Germany . |
| 296 00 561 | 4/1996 | Germany . |
| 447 330 | 11/1934 | United Kingdom . |
| 2 043 200 | 10/1980 | United Kingdom . |
| 2 251 670 | 7/1992 | United Kingdom . |

OTHER PUBLICATIONS

Prospekt: Quadro, Feb. 6, 1981.

Primary Examiner—Lynne H. Browne
Assistant Examiner—David E. Bochra
Attorney, Agent, or Firm—Browdy and Neimark

[57] ABSTRACT

A piece of furniture of modular build-up comprises as basic structural elements a frame and an insert plate to be mounted in the frame compartment by corner fittings. The corner fitting is detachably mounted on the insert plate and comprises at least one laterally accessible receptacle parallel to the plane of the plate for a retaining pin mounted on the frame as well as a locking mechanism for the retaining pin to be arrested in the receptacle.

7 Claims, 3 Drawing Sheets

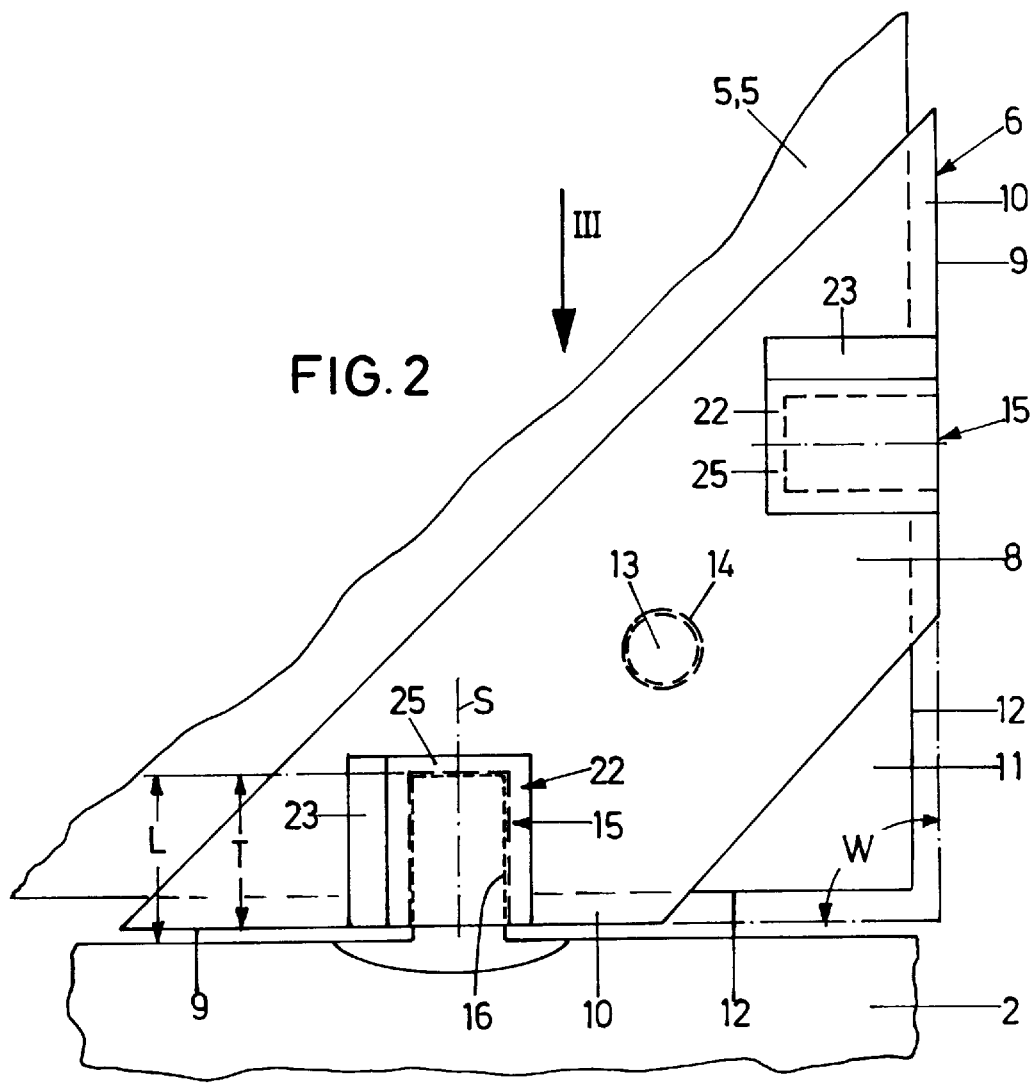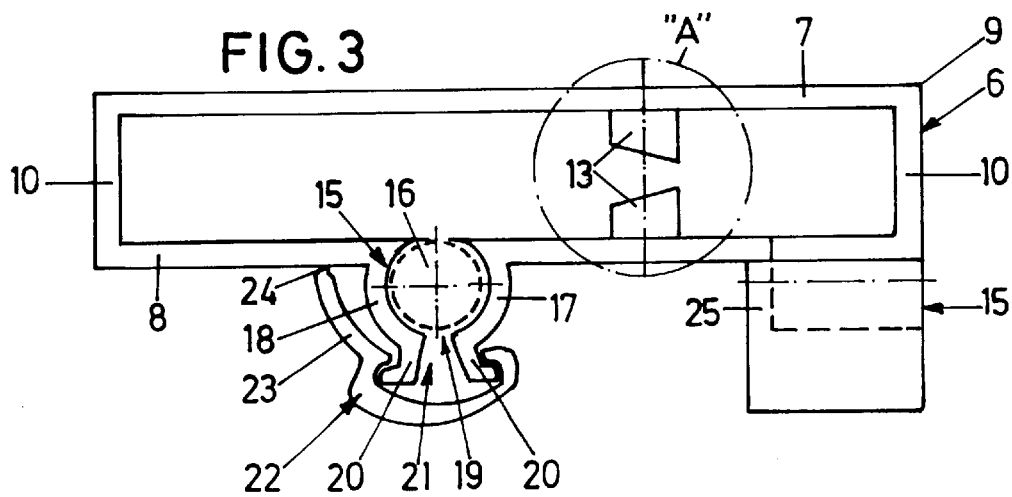

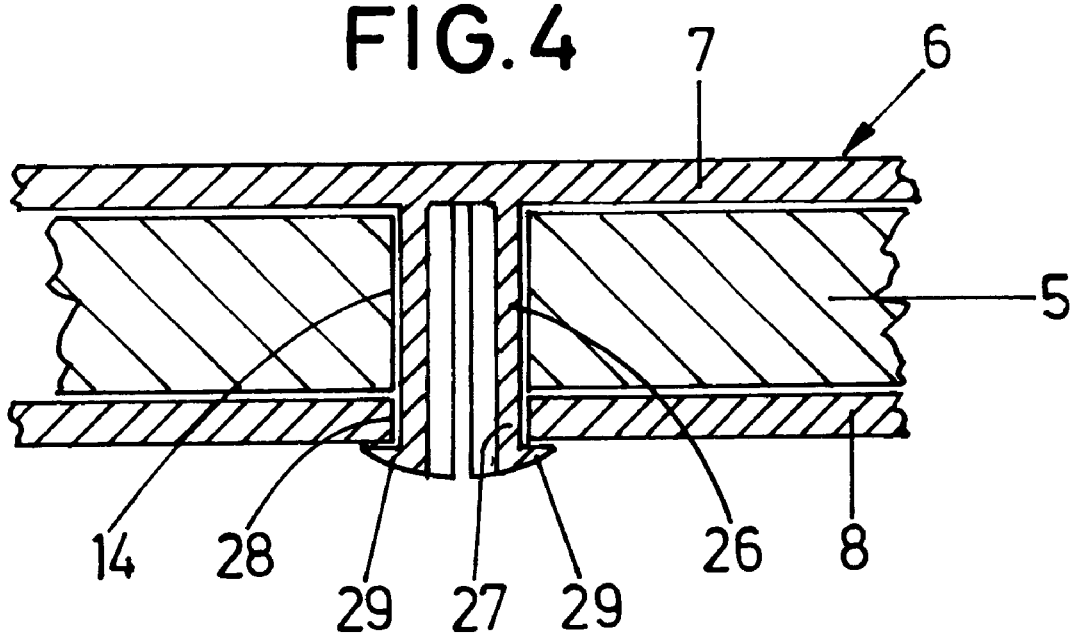
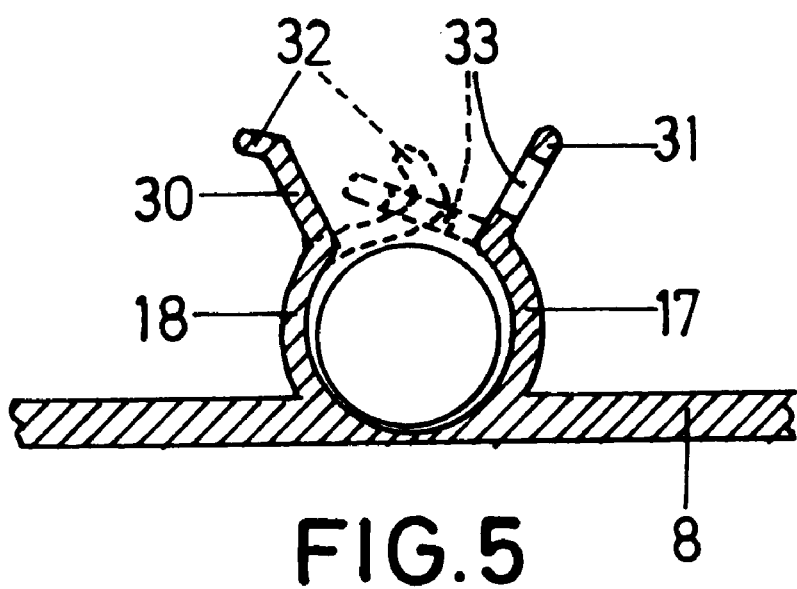

MODULAR FURNITURE

BACKGROUND OF THE INVENTION

1. Field of the Invention

The invention relates to a piece of furniture of modular build-up comprising a frame preferably to be composed of frame members and frame corner joints, and further comprising an insert plate. The frame and the insert plate constitute the basic structural components of the furniture system.

2. Background Art

The frame can be a large-dimension modular construction system as underlying European patent 0 007 065 and U.S. Pat. Nos. 4,353,661, 4,410,292 and 4,411,639.

In this large-dimension modular construction system, normal panels are provided as insert plates, which can be locked into place in the framework or in openings by way of locking flanges. In this way, furniture such as chairs, stools or tables in particular for children, can be designed; however, the large-dimension modular construction system of this known design is not suitable for a piece of furniture of modular build-up, which must have doors, flaps and inside compartments.

SUMMARY OF THE INVENTION

As a remedy, provision is made for the furniture system, the core of which is the corner fitting. This fitting is detachably fixed on the insert plate and provided with at least one laterally accessible receptacle that is parallel to the plane of the plate. Further, a retaining pin is provided in the furniture system, which is mounted on the frame. As explained in conjunction with the exemplary embodiment, the insert plate is to be placed sidewise on the retaining pin located in the frame, owing to the lateral accessibility of the receptacle. For the retaining pin to be arrested in the receptacle, a corresponding locking mechanism is provided on the corner fitting, this locking mechanism not necessarily having to be closed.

Preferred designs as well as further features, details and advantages of the invention will become apparent from the ensuing description of exemplary embodiments of the subject matter of the invention, taken in conjunction with the drawings.

BRIEF DESCRIPTION OF THE DRAWINGS

FIG. 2 is an inside view of a corner fitting when mounted on the insert plate,

FIG. 3 is a view of the corner fitting (without the insert plate) seen from the direction of the arrow m according to FIG. 2, FIG. 4 is a view of an alternative embodiment of the corner fitting for illustration of the detail "A" of FIG. 3, and FIG. 5 is an illustration of an alternative embodiment of the receptacle on the corner fitting.

DESCRIPTION OF THE PREFERRED EMBODIMENTS

Figure 1:
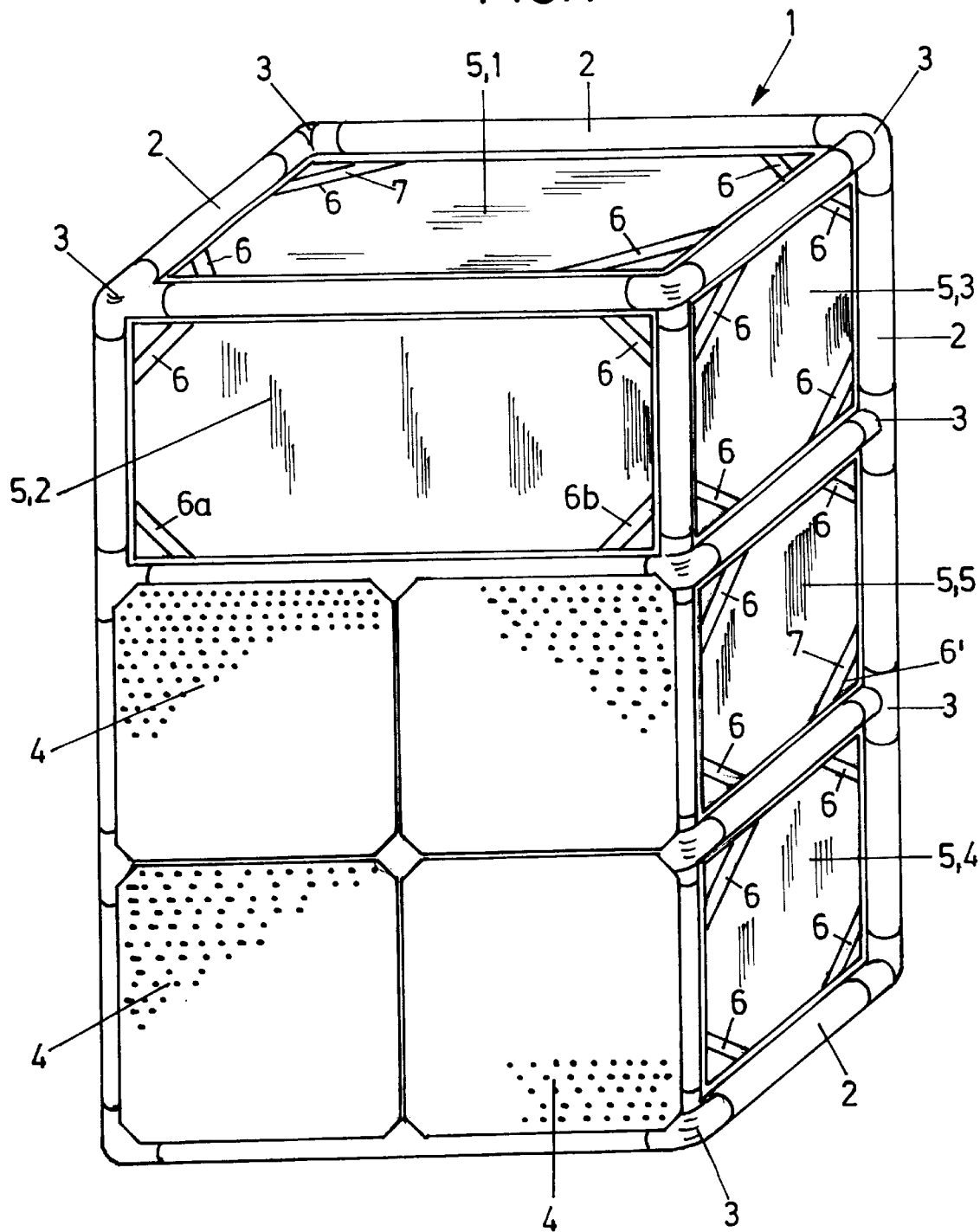
FIG. 1 is a diagrammatic perspective view of a piece of furniture.

FIG. 1 shows a sideboard-type piece of furniture as an example of the piece of furniture according to the invention. The frame 1 is composed of individual cylindrical frame pieces 2 and frame corner joints 3. The frame corner joints 3 may be 6-, 5-, 4- or 3-armed cubic couplings or 4-, 3- or 2-armed rectangular plane couplings. The frame has originated from the large-dimension modular construction system of the company Quadro of D-72770 Reutlingen which is available in the market under the trade name "Quadro". In this system, plastic plates 4, which are dotted in FIG. 1, can be snapped on the frame and screwed on from inside if necessary.

The large-dimension modular construction system is turned into a piece of furniture by the use of the insert plates 5 provided for that particular purpose and the dimensions of which are such that the plates are slightly smaller than the inside width of the individual frame compartments. The insert plates as such can be laminated wood panels, wooden slabs with acrylic glass mirrors lined up, plastic plates, composite steel slabs, grids or the like.

Corner fittings 6 serve to retain the insert plates 5 in the individual compartments of the frame 1.

In the piece of furniture seen in FIG. 1, the insert plate 5.1 is a static panel not to be opened, the insert plate 5.2 is a flap to be swung open about the lower edge, 5.3 and 5.4 are again panels, and 5.5 is a door. These various functions of the insert plates 5 are implemented by the corner fittings 6 being correspondingly fastened in a manner still to be explained.

A first embodiment of the corner fittings 6 is illustrated in FIGS. 2 and 3. This is an injection-molded article of plastic material having flush trapezoidal external and internal lateral sides 7, 8, which are united by connecting legs 10 forming a right angle between them. As seen in FIG. 2, this clip element 6 can be slipped on the corner 11 of each insert plate 5 sufficiently far for the connecting legs 10 to flank the frontal edges 12, perpendicular to each other, of the insert plates 5. In the embodiment seen in FIGS. 2 and 3, two flush, beveled positioning pins 13 injection-molded on the insides of the external and external sides 7, 8 serve to fix the clip element 6. When the corner fitting 6 is placed on the corner 11, the clip element is elastically expanded and pushed on until the positioning pins 13 snap into place in a corresponding hole 14 in the insert plate 5 by reason of the inherent elasticity of the clip element 6.

On its internal lateral side 8, the clip element 6 further comprises two receptacles 15 which are displaced one relative to the other by 90° and which substantially constitute a sleeve for insertion of a retaining pin 16 on the frame piece 2. The axis of the receptacles 15 are parallel to the plane of the plate and consist of two locking arms 17, 18 that are applied by injection-molding, forming between them a plug-in opening 19. The locking arms 17, 18 can be spread apart elastically by their free ends 20, as a result of which it is possible not only to insert the retaining pin 16 axially into the receptacle 15, but also to snap it into the receptacle 15 sidewise from the direction of the arrow 21 of FIG. 3.

For the retaining pin 16 to be arrested in the receptacle 15, provision is made for a clamp 22 which backs up the two free ends 20 cranked outwards in opposite directions, thus fixing the two locking arms 17, 18 in the position seen in FIG. 3 by positive fit and force locking. The clamp 22 is durably fastened to the internal lateral side 8 of the clip element 6 by way of a brace and a film hinge 24. As further seen in FIG. 2, the axial length L of the retaining pin 16 exceeds the depth T of the receptacle 15 so that a transverse bottom 25 of the receptacle rests on the front of the retaining pin 16 and—provided the retaining pin extends upwards—the clip element 6 and thus the insert plate 5 are supported by the pin instead of resting on the frame 1.

As seen in FIG. 1, all the insert plates 5 have clip elements 6 at their four corners. For the various functions, mentioned at the outset of the insert plates 5 to be attained, the clamps 22 on the respective clip elements can be adjusted differently so as to arrest the retaining pins 16 or to keep them detachable from the receptacle 15.

As for the panels 5.1, 5.3 and 5.4 that are not to be opened, retaining pins 16 are mounted in the corner portions of all the four frame pieces so that in the vicinity of the clip elements 6, eight retaining pins 16 project inwards into each frame compartment. Then the corresponding insert plates 5 are placed on from above or sidewise so that the retaining pins 16 lock into place in the respective receptacles 15. Then all the receptacles 15 are secured by the clamps 22 being snapped on.

In the case of the flap 5.2, retaining pins 16 are fixed only on the laterally vertical frame pieces of the corresponding compartment in the lower and upper corner portion and project each horizontally inwards into the compartment. The insert plate 5, which constitutes a flap, is snap-engaged on these pins from the front. Only the locking arms 17, 18 of the two lower clip elements 6a, 6b are arrested by the clamps 22 so that there the retaining pin 16 cannot move out of the receptacle 15 any longer. However, pivoting about the axis of the pin is possible so that the two lower clip elements 6a, 6b of the insert plate 5.2 work as hinges. The clamp 22 is not placed in the case of the two upper clip elements 6 so that the receptacle 15 can be removed from the retaining pins 16 by the locking arms 17, 18 being flexibly spread apart. In this case, the upper clip elements 6 only have a locking function, securing the flap 5.2 in its closed position.

In the case of the lateral door 5.5, the rear clip elements 6, which are positioned one on top of the other, correspondingly operate as hinges by the clamps 22 being placed in the manner described above. The corresponding operational position of the rear lower clip element 6' of the door 5.5 is illustrated in FIGS. 2 and 3. FIG. 2 shows the hinge axis S. Smooth pivotability of the door is ensured by the bottom 25 of the receptacle being supported on the retaining pin 16.

FIG. 4 illustrates an alternative embodiment of the mounting of the clip element 6 on the respective insert plate 5. According to this, a spring sleeve 26, which is formed by a slit pin, is molded on the inside of the external lateral side 7 instead of two positioning pins 13. This spring sleeve 26 again reaches through a corresponding hole in the insert plate, while its free spring ends 27 back up an opposed hole 28 in the internal lateral side 8 of the clip element 6. This means efficient arresting of the clip element 6 on the insert plate. For detachment, the locking projections 29 at the end 27 of the spring sleeve 26 must be pressed inwards and the clip element 6 must be expanded elastically so that the spring sleeve 26 moves out of the corresponding hole in the insert plate 5 and the clip element 6 can be removed.

FIG. 5 illustrates an alternative embodiment of the locking mechanism of the receptacle 15. In this case, the clamp is formed in one piece with the receptacle 15 itself by means of corresponding prolongations 30, 31 at the free ends of the locking arms 17, 18. The free end of the prolongation 30 has a locking nose 32 which—as shown by a dashed line in FIG. 5—can be pushed through, and arrested in, an opening 33 in the opposite prolongation 31.

What is claimed is:

1. A piece of furniture of modular built-up, comprising a frame (1) to be composed of frame pieces (2) and frame corner joints (3) circumscribing a frame compartment, and an insert plate (5) to be mounted in the frame compartment by means of corner fittings (6) as basic structural elements, each corner fitting (6)

being detachably mounted on the insert plate (5), having at least one laterally accessible receptacle (15) parallel to a plane of the plate for a retaining pin (16) mounted on the frame (1), and a locking mechanism (22) for arresting the retaining pin (16) in the receptacle (15), wherein the corner fitting is a clip element (6) to be slipped on a corner of the insert plate (5) and having internal and external lateral sides (7, 8) that flank a front and rear of the insert plate (5) and are connected by connecting legs (10) which run at right angles to the plane of the plate, and wherein the receptacle (15) for the retaining pin (16) is disposed on an internal lateral side (8) of the clip element (6), the receptacle (15) comprising two springy locking arms (17, 18), which are applied by injection-molding and form therebetween a plug-in opening (19) for the retaining pin (16).

2. A piece of furniture according to claim 1, wherein the locking mechanism for the retaining pin (16) to be arrested in the receptacle (15) is a clamp (22) which clasps two free ends (20) of the locking arms (17, 18).

3. A piece of furniture according to claim 2, wherein the clamp is permanently joined to the clip element (6) by way of a film hinge (24).

4. A piece of furniture according to claim 1, wherein the two locking arms (17, 18) of the receptacle (15) can be nested into each other by their free ends (20) for the receptacle (15) to be closed.

5. A piece of furniture according to claim 4, wherein two of said laterally accessible receptacles (15) are identical and mounted on the corner fitting (6), displaced by 90°.

6. A piece of furniture according to claim 4, wherein on inner surfaces, turned toward each other, of the internal and external lateral sides (7, 8), the clip element (6) has positioning pins (13) which are in alignment with each other and engage with corresponding holes (14) in the insert plate (5) for the clip element (6) to be fixed to the insert plate (5).

7. A piece of furniture according to claim 4, wherein a spring sleeve (26) is injection-molded on the inner surface of the external lateral side (7) of the clip member (6), passing through a corresponding hole (14) in the insert plate (5) for the clip element (6) to be fixed thereto and by its free spring ends (27) backing up an opposed hole (28) in the internal lateral side (8).

* * * * *